(12) United States Patent
Nydam et al.

(10) Patent No.: US 9,384,178 B2
(45) Date of Patent: Jul. 5, 2016

(54) REVIEW OF SIGNATURE BASED CONTENT

(75) Inventors: Ronald Nydam, San Jose, CA (US); Amit Gupta, Noida (IN); Scott A. Grant, San Mateo, CA (US); Pankaj Gupta, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 2493 days.

(21) Appl. No.: 11/500,863

(22) Filed: Aug. 7, 2006

(65) Prior Publication Data

US 2007/0136656 A1    Jun. 14, 2007

(30) Foreign Application Priority Data

Dec. 9, 2005    (IN) .......................... 3317/DEL/2005

(51) Int. Cl.
*G06F 17/00*    (2006.01)
*G06F 17/24*    (2006.01)

(52) U.S. Cl.
CPC ..................................... *G06F 17/24* (2013.01)

(58) Field of Classification Search
CPC ............ G06F 17/241; G06F 17/30817; G06F 17/30038; G06F 17/24; G06F 17/242; G06F 17/243; G06F 17/30017; G06F 17/30053; G06F 17/30793; G06F 17/3082; G06F 17/30855; G06F 3/0483; G06F 17/22; G06F 17/30106; G06F 17/30525; G06F 17/3061; G06F 17/30743; G06F 17/30749; G06F 17/30758; G06F 17/30811; G06F 17/30852; G06F 17/30858; G06F 17/30861; G06F 17/30882; G06F 17/30997; G06F 17/2288; G06F 17/30014; G06F 17/30056; G06F 3/04883; G06F 8/71

USPC ......................................... 715/205, 234, 235
See application file for complete search history.

(56) References Cited

U.S. PATENT DOCUMENTS 5,600,775 A    2/1997    King et al.
6,449,653 B2    9/2002    Klemets et al.
(Continued)

OTHER PUBLICATIONS

Leung et al., Handling Signature Purposes in Workflow Systems, 2001.*

(Continued)

*Primary Examiner* — Nathan Hillery
(74) *Attorney, Agent, or Firm* — Kilpatrick Townsend & Stockton LLP

(57) ABSTRACT

Briefly, in accordance with at least one embodiment, a content creator/editor may have content reviewed by one or more reviewers. The content may include one or more signatures or characteristic values to correlate an annotation of the content made by one of the reviewers with respect to a flow of time of the content. The content creator/editor may generate a review file for the content and send the review file to the reviewers. The reviewers may provide annotations to the content with respect to the flow of time of the content, where the annotations may be correlated to the content via the signature or characteristic values of the content, and the reviewers may store the annotations independent of the content. The review process may be managed independent of a managing server where the content creator/editor may generate a review file and send the review file to the reviewers using a client content creation and editing software program on local machine of the content creator/editor. The reviewers may receive the review file, which may include content or the content may be streamed to a local machine of the reviewers using a client review program to manage the obtaining and reviewing of the content. The reviewers may generate annotations of the content independent of content and save them in a file that is sent back to the content creator/editor for aggregation of the annotations and selective viewing of the annotations of the content.

43 Claims, 10 Drawing Sheets

(56) References Cited

U.S. PATENT DOCUMENTS

| | | |
|---|---|---|
| 6,452,615 B1 | 9/2002 | Chiu et al. |
| 6,484,156 B1 | 11/2002 | Gupta et al. |
| 6,956,593 B1 | 10/2005 | Gupta et al. |
| 7,119,814 B2 | 10/2006 | Meron et al. |
| 7,143,357 B1 | 11/2006 | Snibbe et al. |
| 7,209,948 B2 | 4/2007 | Srinivasa |
| 2002/0108112 A1 | 8/2002 | Wallace et al. |
| 2002/0161602 A1 | 10/2002 | Dougherty et al. |
| 2003/0018668 A1 | 1/2003 | Britton et al. |
| 2003/0081853 A1 | 5/2003 | Johnson et al. |
| 2004/0078434 A1 | 4/2004 | Parker et al. |
| 2004/0133436 A1 | 7/2004 | Swain |
| 2004/0240562 A1 | 12/2004 | Bargeron et al. |
| 2004/0261016 A1 | 12/2004 | Glass et al. |
| 2005/0031296 A1 | 2/2005 | Grosvenor |
| 2005/0144096 A1 | 6/2005 | Caramanna et al. |
| 2005/0154679 A1 | 7/2005 | Bielak |
| 2005/0262051 A1 | 11/2005 | Dettinger et al. |
| 2005/0268281 A1 | 12/2005 | Letkeman et al. |
| 2006/0026502 A1 | 2/2006 | Dutta |
| 2006/0123348 A1 | 6/2006 | Ross et al. |
| 2006/0129596 A1 | 6/2006 | Bays et al. |
| 2006/0143558 A1 | 6/2006 | Albornoz et al. |
| 2006/0161838 A1 | 7/2006 | Nydam et al. |
| 2006/0190440 A1 | 8/2006 | Horvitz et al. |
| 2006/0253781 A1 | 11/2006 | Pea et al. |
| 2006/0282762 A1 | 12/2006 | Diamond et al. |
| 2006/0282776 A1 * | 12/2006 | Farmer et al. ................ 715/719 |
| 2007/0011206 A1 | 1/2007 | Gupta et al. |
| 2007/0079321 A1 * | 4/2007 | Ott ................................ 725/18 |
| 2009/0307201 A1 * | 12/2009 | Dunning et al. ................ 707/4 |

OTHER PUBLICATIONS

Wilcox et al., Annotation and Segmentation for Multimedia Indexing and Retrieval, IEEE 1998, pp. 1-8.

Abowd et al., Anchoring Discussions in Lecture: An Approach to Collaboratively Extending Classroom Digital Media, 1999, pp. 11-19.

Costa et al., Annotations as Multiple Perspectives of Video Content, ACM 2002, pp. 283-286.

Chiu et al. LiteMinutes: An Internet-Based System for Multimedia Meeting Minutes, ACM 2001, pp. 140-149.

Geyer et al., A Team Collaboration Space Supporting Capture and Access of Virtual Meetings, ACM 2001, pp. 188-196.

U.S. Appl. No. 11/035,990, filed Jan. 14, 2005, Nydam et al.

U.S. Appl. No. 11/035,990, filed Jan. 14, 2005, Nydam et al., Office Action mailed Aug. 22, 2007.

* cited by examiner

REVIEW OF SIGNATURE BASED CONTENT

BACKGROUND

Creating multimedia content for multimedia productions typically involves a team of more than one person to create and/or to review the content to provide any feedback or other comments to the content creator and editor. In the past, the review of preliminary media productions was a manual process. The video to be reviewed would be recorded to a medium such as a videotape or a digital video disk (DVD) and then physically mailed to the reviewer. If multiple reviewers were involved, then multiple copies of the original rough cut media content would be made. The reviewers would receive the videotape or DVD, find a proper playback device and then watch the video. The reviewers would take hand written notes of any comments they have about the video being watched. Often, the comments are related to specific moments in the video. Timing data would either be visibly recorded over a portion of the video being reviewed, or a numerical counter on the videotape player or DVD player would be referenced to provide a time based context for the comments being made. Once the review was completed, the notes would then be mailed back to the editor. The editor would then manually reference the comments and attempt to coordinate align the comment to a specific moment in the video project. The accuracy of such comments with respect to the timeline often would be subject to the error of the reviewer, the reviewer's playback machine, and also of the content editor and the content editor's playback machine.

DESCRIPTION OF THE DRAWING FIGURES

The subject matter regarded as the claimed subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

Figure 1:
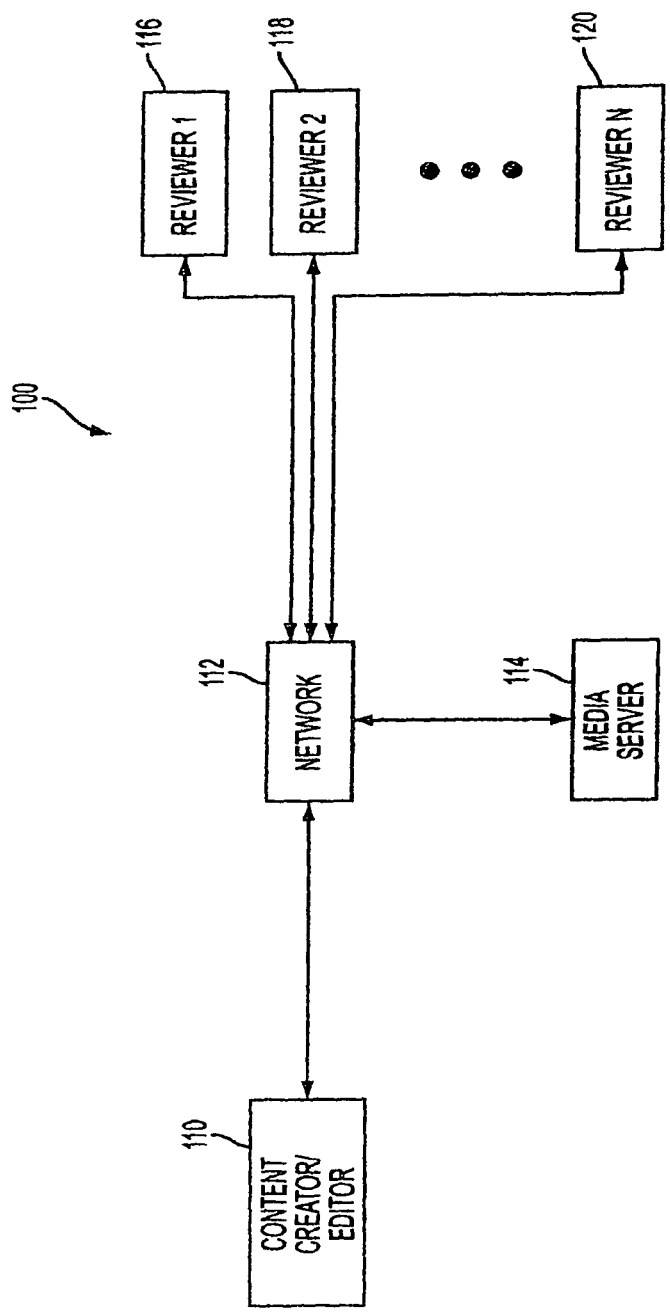
FIG. 1 is a block diagram of a content review system accordance with one or more embodiments.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail.

Some portions of the detailed description that follows are presented in terms of algorithms, programs or the like and/or symbolic representations of operations on data bits or binary digital signals within a computer memory. These algorithmic descriptions and representations may be the techniques used in the data processing arts to convey the arrangement of a computer system or other information handling system to operate according to the programs.

An algorithm may be generally considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system or other information handling system.

Embodiments may include apparatuses for performing the operations herein. This apparatus may be specially constructed for the desired purposes, or it may comprise a general purpose computing device selectively activated or configured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device or other information handling system.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will be apparent from the description below. In addition, embodiments are not described with reference to any particular programming language. It will be appreciated that a variety of programming languages may be used to implement the teachings of the claimed subject matter as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other. Furthermore, words or terms that connote a conditional occurrence with respect to time, such as when or upon, may mean at a particular instant in time and may also mean near a particular instant in time and may include times preceding the instant in time and times subsequent to the instant in time, for example after a delay period from the particular instant in time. In addition, where a public available or commonly utilized standard is discussed, any one or more promulgated versions of the standard may be suitable for any one or more embodiments, and may include prior versions, current versions, and/or future adopted versions.

Referring now to FIG. 1, a block diagram of a content review system accordance with one or more embodiments will be discussed. As shown in FIG. 1, a content creator/editor 110 may create or edit media content, which may include for example an electronic video file, an electronic audio file, an electronic audio/video file or multimedia, or a graphical animation file or the like. Content creator/editor 110 may desire to have the media content reviewed by one or more reviewers including a first reviewer 116 (Reviewer 1), a second reviewer 118 (Reviewer 2), up to N number of reviewers (Reviewer N) with an Nth reviewer 120. In one embodiment, reviewers 116-120 may be in a location remote from the location of content editor/creator 110. In such an arrangement, content to be reviewed may be transmitted to reviewers 116-120 via a network 112 that may allow reviewers 116-120 to obtain and review the content from their local machine or computing platform. Network 112 may be a local area network (LAN) or may be a wide area network (WAN) or metropolitan area network (MAN). In addition, network 112 may be a wired network such as an Ethernet network or may be a wireless network such as a wireless local area network or a cellular telephone network, or a combination of a wired and wireless network. Furthermore, network 112 may include the Internet or the like type of network, although the scope of the claimed subject matter is not limited in this respect. In one embodiment, the content to be reviewed may be stored on a media server 114 and streamed to reviewers 116-120 via network 112, and in an alternative embodiment, content creator/editor 110 may send the content to be reviewed directly to reviewers 116-120 for their review, although the scope of the claimed subject matter is not limited in this respect. In one or more embodiments, content creator/editor 110 may desire to have content reviewed and annotated by one or more of reviewers 116-120 wherein the annotations correspond to one or more signatures of the reviewed content with respect to a time based flow of the content. For example, one signature of the content may comprise a timeline of the content based at least in part on the passage of time at given time values as the content is played or otherwise displayed. In such an arrangement, reviewers 116-120 may review the content with respect to the timeline, and provide annotations of the content at one or more time values in the timeline. The annotations of the content may then be selectively displayed by content creator/editor 110 upon the occurrence of the signature during playback of the content. In one embodiment, the signature may comprise the time values of the timeline at which the annotations were made by one or more of reviewers 116-120. In alternative embodiments, other signatures of the content may be utilized to determine when the corresponding annotations are displayed during playback of the content, either in combination with the timeline time values, or alternatively independent of the timeline time values, although the scope of the claimed subject matter is not limited in this respect. In one or more embodiments, a non-exhaustive list of optional signatures of the content may include a color value of an image of the content as a whole or a part of the image, a brightness value of an image of the content as a whole or a part of the image, an opacity or transparency value of an image of the content as a whole or a part of the image, a value corresponding to an audio level of a sound file or track of the content for example a decibel value of an audio signal, an object in the content, a spatial location or coordinate value within a coordinate grid of an image of the content, any change in value, or a differential with respect to time, of a signature from one point in time to another point in time for example a change in a color value, a change in a brightness value, a change in an object, a change in an audio signal level value, a change in an opacity or transparency value, or the signature may comprise any preexisting metadata applied to any predetermined portion of the content, for example a clip, a frame, or any other of the above listed signature values, for example metadata that indicates a camera iris setting or an aperture setting, although the scope of the claimed subject matter is not limited in this respect. In one or more embodiments, the location of the correlating pair or pairs of signature values may be determined non-linearly with respect to the time based flow of the content. Such an arrangement allows the information that correlates the signature values to the content to be provided with respect to a context of a moment in the content in which the signature values appear and/or where the annotations are made. In other embodiments for non-temporal content, for example still images, three-dimensional models, menus for digital versatile disks or the like, and/or non-contiguous layouts as utilized with the content of digital versatile disks or the like, correlation between annotations of the content and the signature values of the content may be global and not based on a timeline or a time reference, although the scope of the claimed subject matter is not limited in this respect.

In one or more embodiments, although a media server 114 is shown as being an optional intermediate storage location for a content file to be reviewed by one or more of reviewers 116-120, media server 114 optionally may not control the review of the content by reviewers 116-120 in a client-server type of system. Thus, content/creator editor 110 may create content to be reviewed by reviewers 116-120 using a local machine and then send the a review file to one or more of reviewers 116-120 which may be received at the local machines of reviewers 116-120 via network 112. In such an arrangement, network 112 is a transmission medium over which the review file is transmitted from content creator/editor 110 to one or more reviewers 116-120 without requiring network 112 to be involved in controlling the review of the content of the review file by reviewers 116-120. Likewise, in such an arrangement media server 114 is a storage location from which one or more of reviewers 116-120 may download or stream the content to be reviewed on the local machines of reviewers 116-120 without requiring media server 114 to be involved in controlling the review of the content of the review file by reviewers 116-120. In such an arrangement, content creator/editor 110 may create content on a local machine using a client software program running on the local machine to generate a review file to be sent to reviewers 116-120 who may then review the content of the review file and make annotations or comments using a client software program running on their local machines to generate an annotation file that is sent back to content creator/editor 110 who may aggregate the annotations received from reviewers 116-120 using the client software program initially used to create the review file. Such an arrangement may be considered to be a client-client based review and annotation process rather than a client-server based review and annotation process, although the scope of the claimed subject matter is not limited in this respect. In one or more embodiments, one or more of reviewers 116-120 may collaborate with another one or more of reviewers 116-120 during the review process. In such an arrangement, annotations of the reviewers 116-120 may be stored on a server commonly accessible to one or more of reviewers 116-120, for example media server 114 so that the reviewers may be able to review the annotations of other reviewers and make additional comments, changes, or other annotations to their own annotations and/or to the comments and/or annotations of one or more of the other reviewers. Such additional annotations may be synchronized with the annotations of reviewers 116-120 and sent to content creator/editor 110 for aggregation of the annotations. In one particular embodiment, such collaborative review of the annotations of other reviewers may be controlled via one or more security measures such as passwords or encryption. For example, it may be desirable to prevent one of reviewers 116-120 from reviewing the annotations of another one of reviewers 116-120. Such security measures may be implemented to control who has access to the annotations of designated reviewers, although the scope of the claimed subject matter is not limited in this respect.

Figure 2:
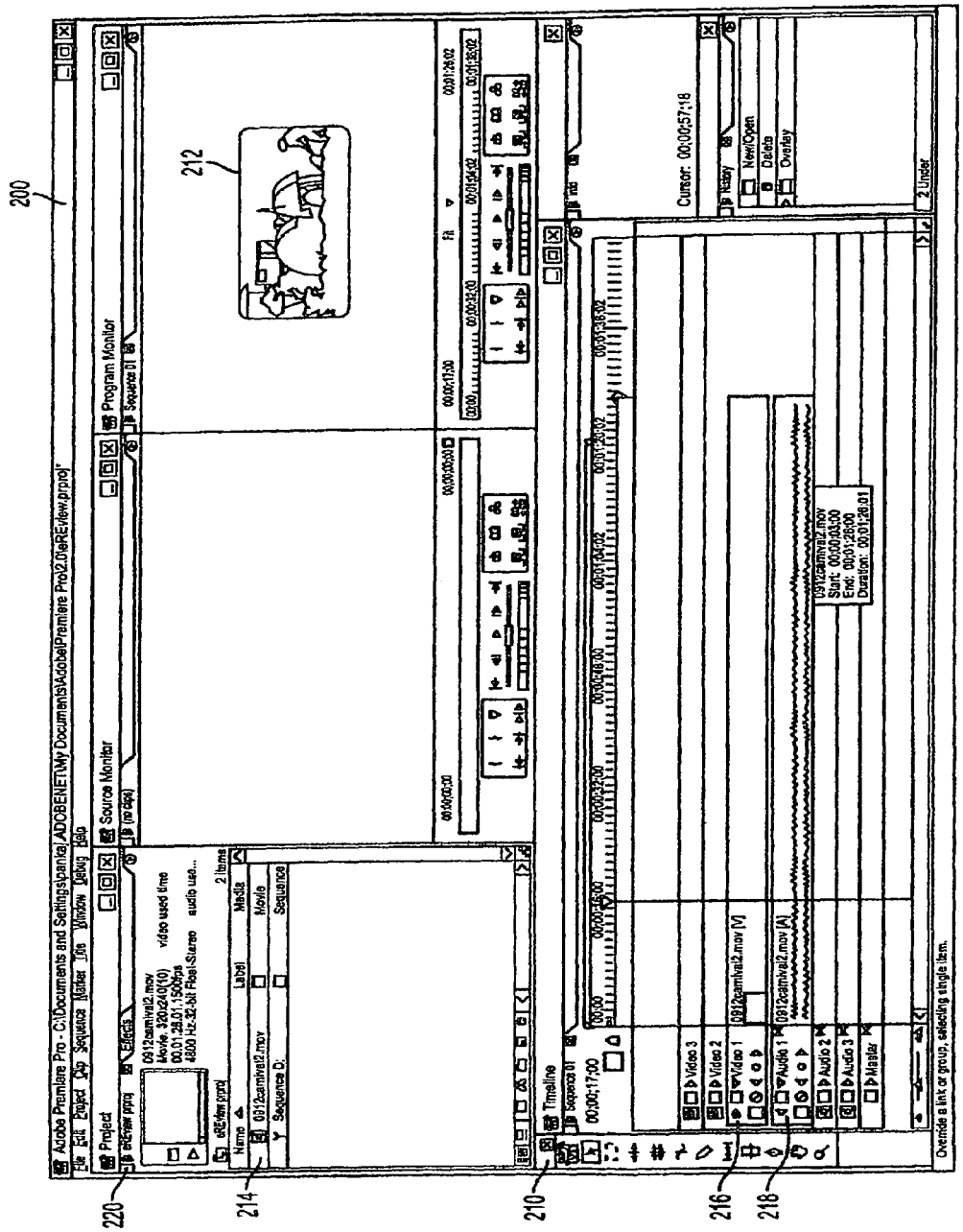
FIG. 2 is a diagram of a program interface for creating and editing signature based content in accordance with one or more embodiments.

Referring now to FIG. 2, a diagram of a program for creating and editing signature based content in accordance with one or more embodiments will be discussed. As shown in FIG. 2, content creator/editor 110 may create or edit content using a content creation or editing program interface 200 of a content creation or editing program. The content creation or editing program that includes content creation or editing program interface 200 may comprise, for example, Adobe® Premiere® Pro 1.5 or the like available from Adobe Systems Incorporated of San Jose, Calif., USA. In one embodiment as discussed herein, the signature of the content will be discussed as timeline time values, although the scope of the claimed subject matter is not limited in this respect. A timeline 210 for the content 212 may be created and associated with media file 214 that contains content 212. As shown in FIG. 2, timeline 210 may include a timing reference for both a video portion 216 of media file 214 and an audio portion 218 of media file 214. Other signatures may also be identified and associated with media file 214. In one or more embodiments, media file 214 may comprise a portion of or all of a project 220 of which content 212 may comprise a portion. In such embodiments, content editor/creator 110 may select a desired portion of project 220 to be reviewed. This may be done, for example, by selecting one or more portions of project 220 as content 212 to be reviewed. Furthermore, content creator/editor 110 may designate a first portion of project 220 or content 212 to be reviewed by a first reviewer 116, a second portion of project 220 or content 212 to be reviewed by a second reviewer 118, and so on wherein first reviewer 116 reviewers content 212 that may be different in part or in whole from the content 212 reviewed by second reviewer 118. In one embodiment, first reviewer 116 may not review the same portion of content 212 as reviewed by second reviewer 118, and furthermore first reviewer 116 may not see the annotations made by second reviewer 118, and second reviewer 118 may not see the annotations made by first reviewer 116. The annotations of content 212 made be first reviewer 116 and second reviewer 118 may be sent to content editor/creator 110 and then combined and aggregated with respect to their occurrences in timeline 210, wherein content creator/editor 110 may view the annotations made by all of reviewers 116-120 or may selectively view the annotations of a selected one or more or reviewers 116-120 without viewing the annotations of non-selected ones of reviewers 116-120, although the scope of the claimed subject matter is not limited in this respect.

As shown in FIG. 2, timeline 210 may correspond to one or more signatures of the content 212 of media file 214 for some portion of or the entirety of content 214 from a beginning point to an end point during playback of media file 214. Such a signature may provide a reference against which a reviewer of content 212 may make annotations of content 212 so that the annotations when sent back to content creator/editor 110 may be observed by content editor/creator 110 when such a signature or signatures occur, or near such an occurrence, for example at the time values of timeline 210 corresponding to the annotations. Otherwise, program interface 200 may selectively not display the annotations when the signatures do not occur during playback, for example at other time values, although the scope of the claimed subject matter is not limited in this respect. Once a signature such as timeline 210 is associated with content 212, program interface 200 may export a review file to one or more reviewers 116-120 for review of content 212.

Figure 3:
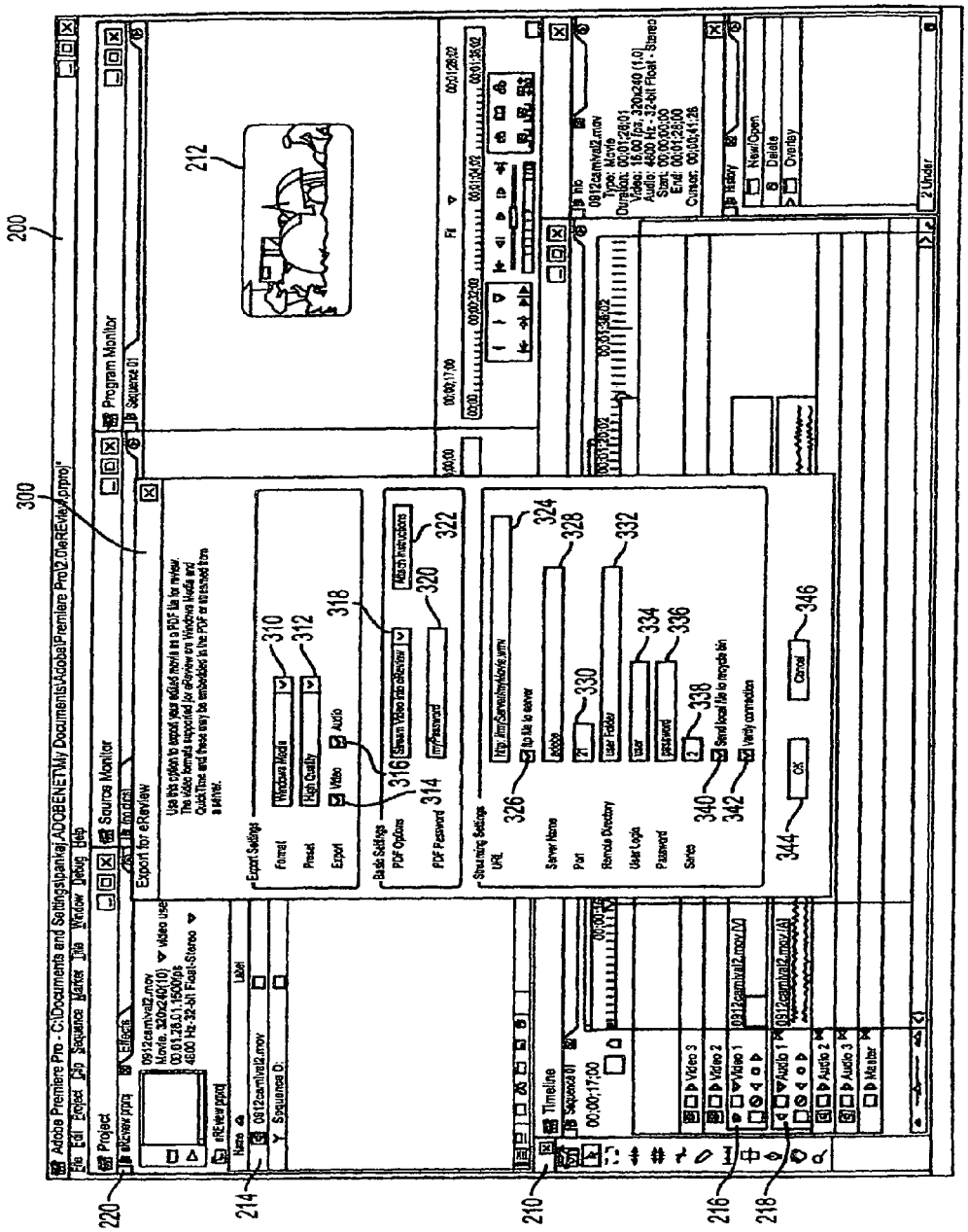
FIG. 3 is a diagram of a control dialog for exporting timeline based content for review in accordance with one or more embodiments.

Referring now to FIG. 3, a diagram of a control dialog for exporting signature based content for review in accordance with one or more embodiments will be discussed. Once a timeline 210 or other signature has been created for content 212 of media file 214, the content creator/editor 110 may export a file for review by one or more reviewers 116-118, in which one or more reviewing options may be selected by the content creator/editor 110. As shown in FIG. 3, a control dialog 300 may be utilized to export the review file with options selected by content creator/editor 110. For example, the format of media file 214 may be selected using pull down menu 310 wherein one or more content formats may be selected such as Windows Media or QuickTime formats. The quality of media file 214 may be selected using pull down menu 312 to select, for example, size of the video file, sampling rate, compression ratio, and so on. Content creator/editor 110 may select to export video portion of content 212 via selection box 314 or an audio portion of content 212 via selection boxes 316 or both video and audio portions. Content creator/editor 110 may select to provide media file 214 to reviewers 116-120 by streaming media file 214 to reviewers 116-120 or alternatively by incorporating media file 214 into the exported review file via pull down menu 318. Optionally, a password for controlling access to the review file may be entered into box 320 if a level of security is desired. Furthermore, content creator/editor 110 may selective attach instructions to reviewers 116-120 via button 322 which for example may allow content creator/editor 110 to attach a text file or the like to the review file that includes instructions for reviewers 116-120 to follow as part of their review of content 212. In one embodiment, program interface 200 of the content creation and editing program may allow a review file to be exported an Adobe® Portable Document Format file specified by Adobe Systems Incorporated of San Jose, Calif., USA, that is able to be reviewed using an Adobe Acrobat® program which reviewers 116-120 may utilize to review content 212 and to provide annotations of content 212, although the scope of the claimed subject matter is not limited in this respect. In one or more embodiments, the review file may be optionally compressed to reduce the size of the review file, for example where the review file contains content 212 or where the review file is sent to a reviewer via electronic mail, although the scope of the claimed subject matter is not limited in this respect.

As shown in FIG. 3, where content creator/editor 110 selects to have content 212 to be reviewed by reviewers 116-120 via streaming the content 212 to the reviewers 116-120 as selected using pull down menu 318, one or more streaming settings may be selected by content creator/editor 110. For example, the uniform resource locator (URL) address where media file 214 containing content 212 is stored may be provided in box 324. Optionally, content creator/editor 110 may select to utilize a file transfer protocol (FTP) to provide access to media file 214 via selection box 326. In such an arrangement, the name of the media server 114 may be provided in box 328, the port through which media file 214 may be accessed may be provided in box 330, and the remote user directory may be provided in box 332. A user name and password for accessing the directory may be provided in boxes 334 and 336, respectively, to provide a level of security for accessing media file 214, and the number of retries allowed before access to media file 214 fails may be provided in box 338. Optionally, the review file may be encrypted using encryption methods such as a public key and private key encryption arrangement, although the scope of the claimed subject matter is not limited in this respect. Optionally, a selection may be made to send the local file to the recycle bin after viewing using box 340, and the connection to media file 214 may be optionally verified using box 342. Upon selection of the desired options for the review file, the review file may be exported by selecting an "OK" button 344, or optionally the exporting of the review file may be canceled by selecting a "Cancel" button 346. Once the review file has been exported using control dialog 300, the review file may be sent to one or more reviewers 116-120 for review via network 112, for example by sending the review file to reviewers 116-120 via electronic mail (e-mail), although the scope of the claimed subject matter is not limited in this respect. Once reviewers 1160-120 have received the review file, reviewers 116-120 may open the review file to view content 212 and to provide annotations of content 212 based at least in part on one or more signatures of content 212.

Figure 4:
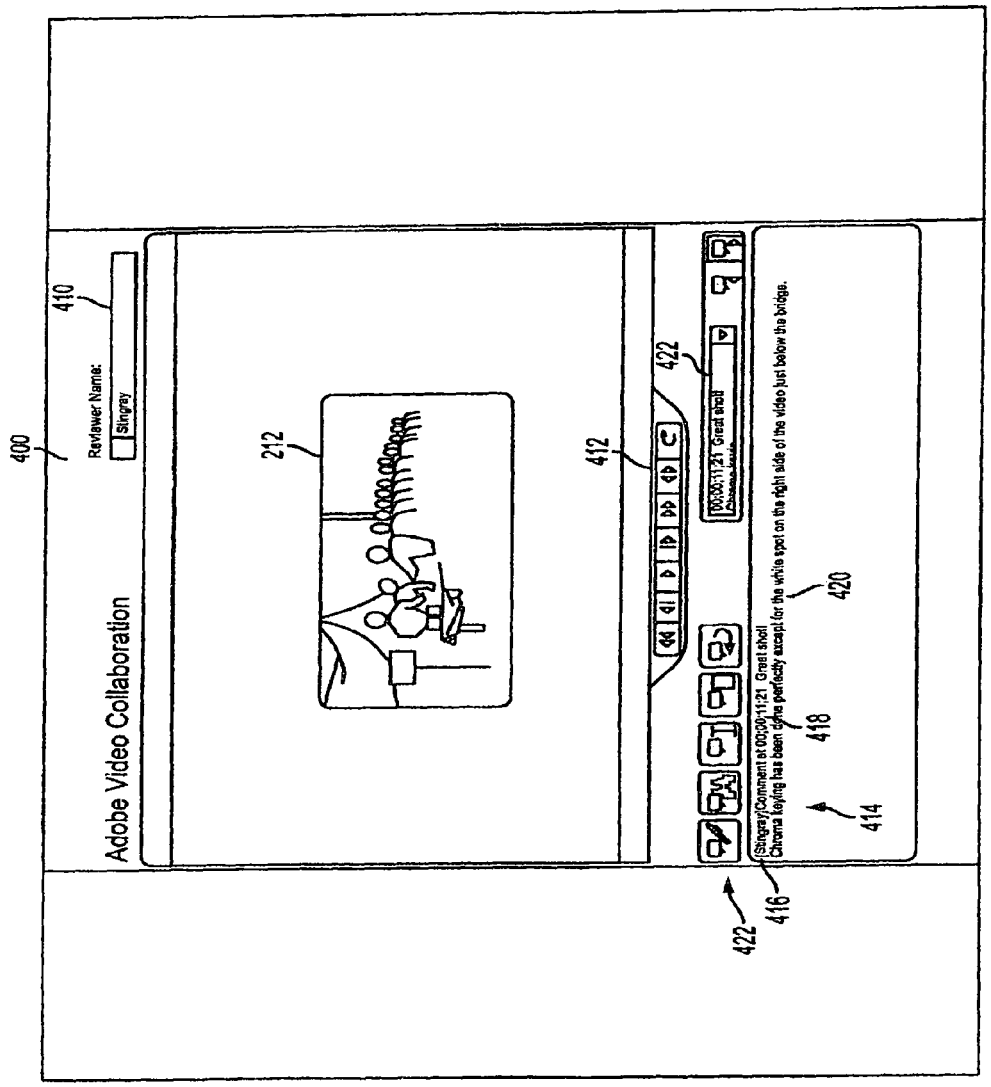
FIG. 4 is a diagram of a program interface for reviewing and annotating signature based content in accordance with one or more embodiments.

Referring now to FIG. 4, a diagram of a program for reviewing and annotating signature based content in accordance with one or more embodiments will be discussed. When one or more of reviewers 116-120 receive a review file to be reviewed from content creator/editor 110, a review program 400 may be opened to allow reviewers 116-120 to review content 212 so that reviewers 116-120 may provide annotations of content 212 based at least in part on a signature of content 212. A unique identifier for a given reviewer may be entered into box 410 which may comprise, for example, the name of the reviewer or similar identifier. Media control buttons 412 may allow a review to play media file 214 so that the reviewer may review selected portions of content 212. For example, media control buttons may include a play/pause button, a fast forward button, a rewind button, a jump to beginning button, a jump to end button, a volume control/mute button, or a loop control button, or similar media controls for controlling the playback of selected portions of content 212, although the scope of the claimed subject matter is not limited in this respect. A reviewer may play back media file 214 to review content 212 and may pause the playback of media file 214 to allow one or more annotations to be made at the selected point at which the playback is paused. For example, annotations such as text based comments may be entered into box 414. As shown in FIG. 4, such an annotation may include the identifier of the review entered into box 410 at point 416. A signature of content 212 at the point at which the annotation is made may be indicated at point 418, for example the time value of timeline 210 at which playback of media file 214 is paused. Text comments of the annotation may be indicated at 420. A list of one or more of the annotations may be selected using pull down menu 422. In the event that a reviewer uses pull down menu 422 to select an annotation different from the present annotation, review program 400 may jump to that portion of content 212 and display the particular content along with the corresponding selected annotation. In such an arrangement, a reviewer may selectively display and review again if desirable previously made annotations, for example where the reviewer reviews content 212 at several review sessions over the course of time. Various other control buttons 422 may be included with review program, for example to allow graphical annotations, text based annotations, audio based annotations, video based annotations, to save the review file for later reviewing, to edit or delete previously entered annotations, and so on, although the scope of the claimed subject matter is not limited in this respect.

Figure 5:
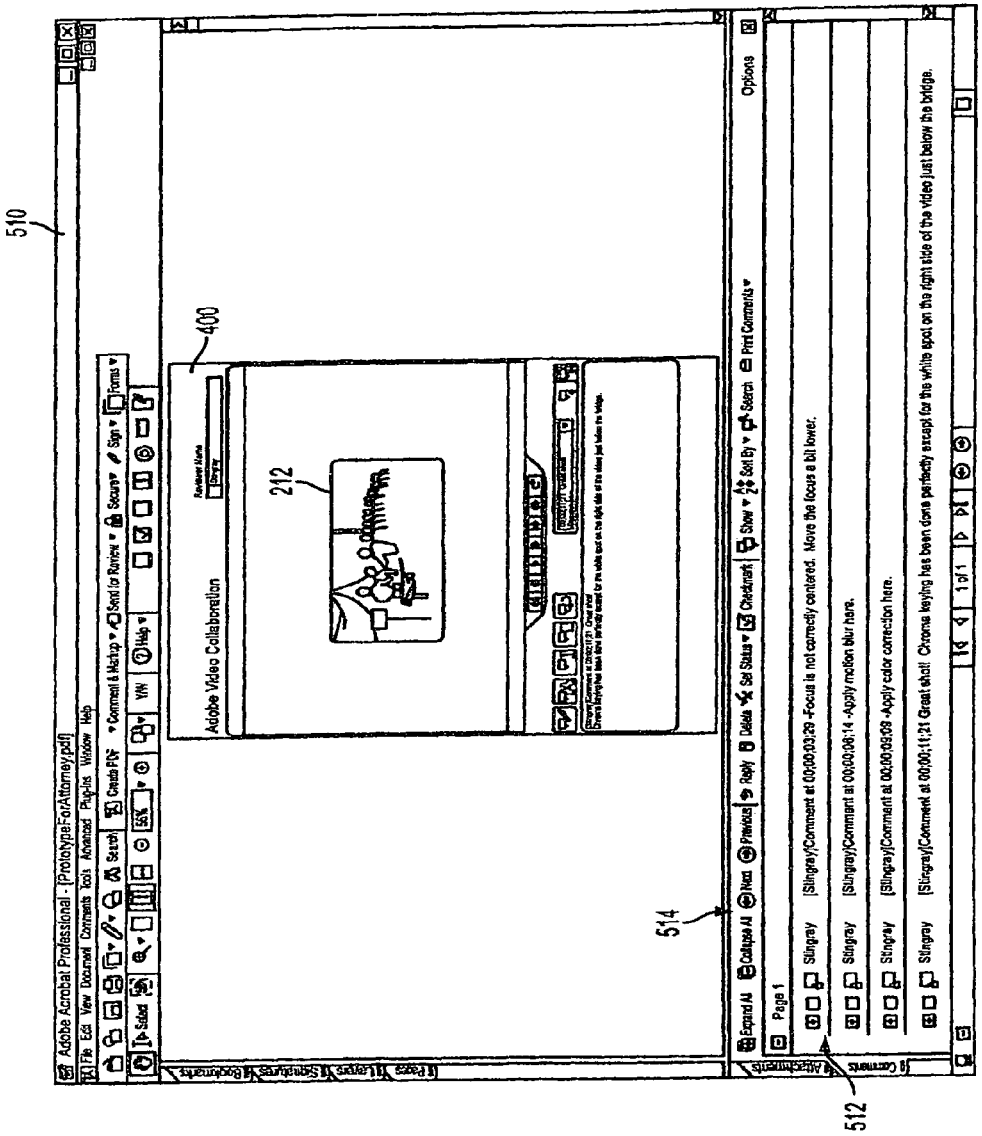
FIG. 5 is an alternate diagram of a program interface for reviewing and annotating signature based content in accordance with one or more embodiments.

Referring now to FIG. 5, an alternate diagram of a program for reviewing and annotating signature based content in accordance with one or more embodiments will be discussed. As shown in FIG. 5, review program 400 may be run as part of an Adobe Acrobat® program 510 or the like that allows annotations to be made to content 212 using one or more tools of the Adobe Acrobat® program. Alternatively, review program 400 may be incorporated as part of any suitable program such as a word processor, web browser, or a stand alone reviewing and commenting program, or any other program that allows the review file to be viewed and edited, for example using a plug-in or the like. Such programs as program 510 may allow for various methods to annotate content 212 using tools provided by such program 510, and may also allow for various alternative views of annotations and other comments either individually or in aggregate such as shown at 512 and which may provide further control of viewing, adding, deleting, sorting, printing or editing annotations made by reviewers 116-120, for example using annotation control buttons 514, although the scope of the claimed subject matter is not limited in this respect. Once one or more reviewers have made annotations to content 212, the annotations may be saved as an annotation file or the like, and sent back to content creator/editor 110, for example via network 112 such as via an e-mail program, although the scope of the claimed subject matter is not limited in this respect. In one or more embodiments, the annotation file may be generated independent of the content 212 or any related media file 214. In such an arrangement, the annotation file may be sent back to content creator/editor 110 without requiring an intervening or controlling sever to control the sending of the annotations or the review file back to content creator/editor 110. Content creator/editor 110 may receive the annotation file from one or more of reviewers 116-120 and then incorporate one or more annotations in aggregate from one or more reviewers 116-120 using the client based content creation and editing software on the local machine of the content creator/editor 110, although the scope of the claimed subject matter is not limited in this respect.

Figure 6:
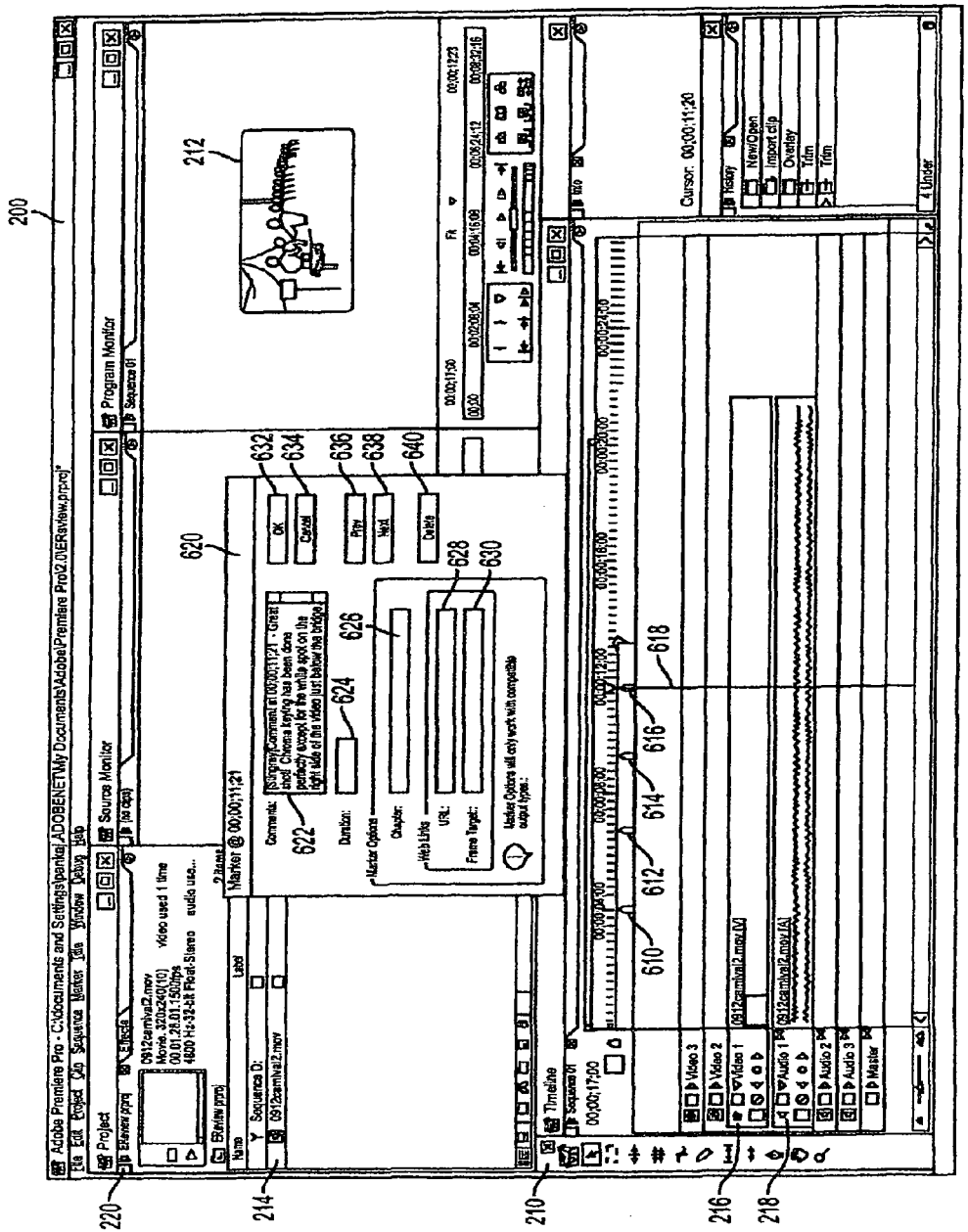
FIG. 6 is a diagram of a program interface for creating and editing signature based content in which reviewed content may be displayed in accordance with one or more embodiments.

Referring now to FIG. 6, a diagram of a program interface for creating and editing signature based content in which reviewed content may be displayed in accordance with one or more embodiments will be discussed. Once content creator/editor 110 receives annotations back from one or more reviewers 116-120, content creation or editing program interface 200 may integrate the one or more annotations received from reviewers 116-120 may be integrated with timeline 210 at corresponding time values in timeline 210 where the annotations occur at markers 610, 612, 614, and 616, for example. One or more of markers 610, 612, 614, or 616 may be, for example, a metadata tag that includes information about the annotation for the associated marker. Content creating or editing program interface 200 may display the time location of markers 610-616 on timeline 210 to provide a visual indication to content creator/editor 100 where markers 610-616 occur on timeline 210 and relative to one another in aggregation. When annotations of content 212 are received from reviewers 116-120 and integrated with timeline 210, content creation or editing program interface 200 may allow media file 214 to be played back to content creator/editor 110 so that annotations may be displayed and viewed by content creator/editor 110 when the signatures corresponding to the annotations occur, for example at the time values of markers 610-616. A marker 618 may indicate the present time of the currently viewed content 212 during playback of media file 214, where marker 618 may move past timeline 210 as the content 212 is viewed over time. When marker 618 coincides with at least one of markers 610-616, the annotation corresponding to the current one of markers 610-616 may appear, for example in marker dialog box 620. In one or more embodiments, marker dialog box 620 may display one or more of the annotations corresponding to the present marker, which in the example shown in FIG. 6 is marker 616. For example, text comments on content 212 may be displayed in box 622. Furthermore, other additional annotations may be displayed or otherwise indicated. For example, where a reviewer had provided a graphical annotation directly on content 212 such as by using a drawing program during review, such graphical annotation may be displayed concurrently with content 212, for example with the graphical annotation overlaid on the content 212. In addition, audio and/or video annotations may be played at this point when provided. Comment dialog box 620 may display comments for a predetermined duration, which may be set by a reviewer or set by content creator/editor 110. Such a duration may be indicated at 624. Additional marker options may be set as well, for example an indication of a chapter for content 212 in box 626, a link to a web site where additional information may be stored may be provided in box 628, or a frame target may be provided in box 630.

Marker dialog box 620 may include various buttons to control the corresponding marker 616. For example, an "OK" button 632 may be utilized to accept any changes made to the attributes of marker 616, or a "Cancel" button 634 may be utilized to reject any changes made to marker 616. A "Prev" button 636 may be utilized to jump back in timeline 210 to the previous marker 614, and a "Next" button 638 may be utilized to jump forward in timeline 210 to the subsequent marker (not shown) in timeline 210. By using such buttons 636 and 638, content creator/editor 110 may jump around timeline 210 and view the annotations of selected markers 610-616 without waiting for the linear passage of time for marker 618 to coincide with a desired one or markers 610-616, and without waiting for the duration of the display of the markers as indicated at 624. Optionally, content creator/editor 110 may delete the maker currently displayed in marker dialog box 620 via "Delete" button 640.

Figure 7:
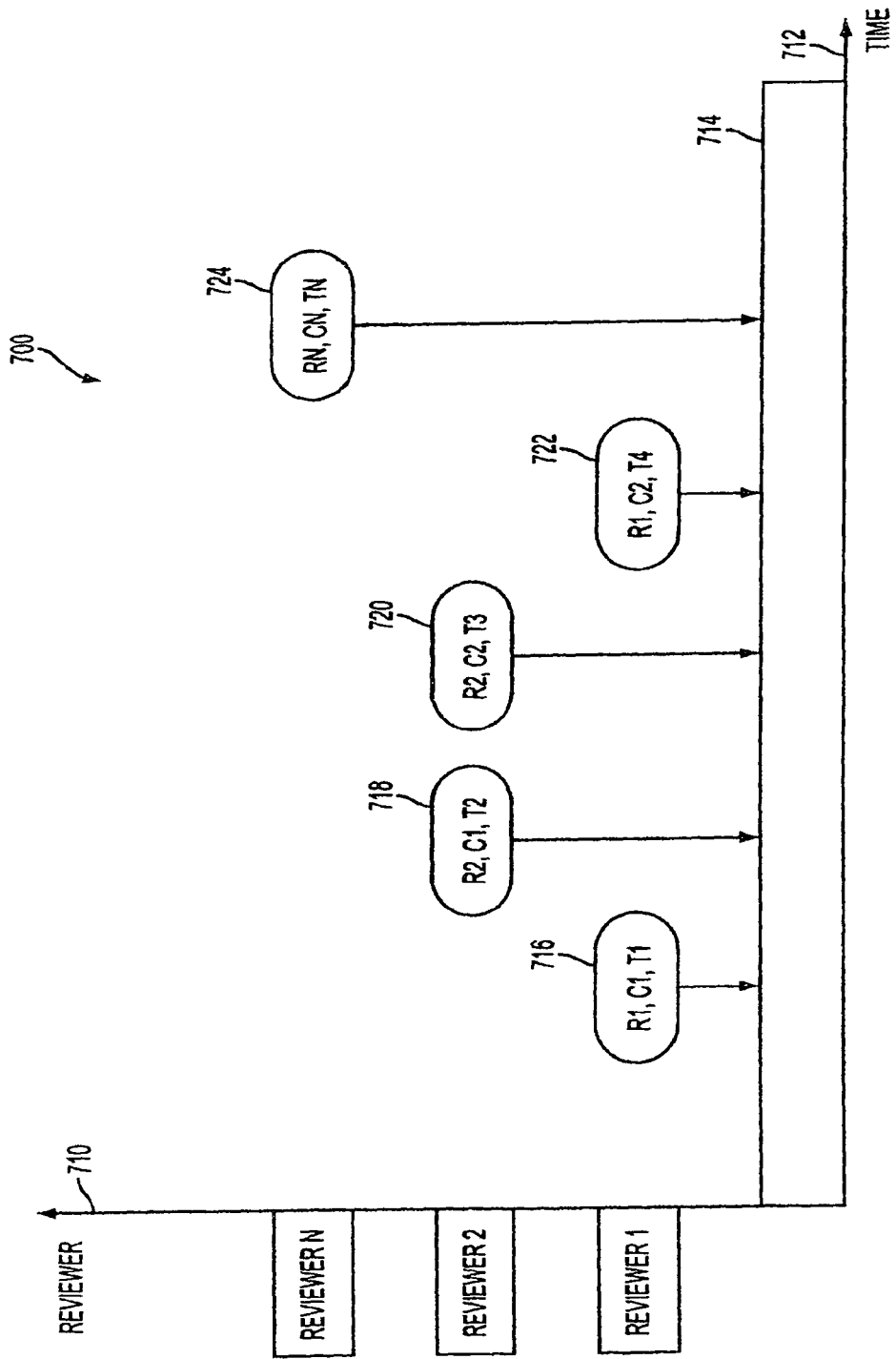
FIG. 7 is a diagram of an annotation map showing the integration of the comments of multiple reviewers with a timeline of signature based content in accordance with one or more embodiments.

Referring now to FIG. 7, a diagram of an annotation map showing the integration of the comments of multiple reviewers with a timeline of timeline based media content in accordance with one or more embodiments will be discussed. In one or more embodiments, the signature of content 212 correlating to annotations made by one or more reviewers 116-120 may comprise timeline based, at least in part. In such embodiments, an annotation map 700 may indicate the aggregation of one or more annotations from one or more reviewers 116-120 with respect to timeline 714. Reviewers 116, 118, and 120 may be indicated on an ordinate axis 710 of annotation map 700, and time may be indicated on an abscissa axis 712. A timeline 714 may indicate time values of content 212, and annotations 716, 718, 720, and 724 may be indicated at corresponding time values in timeline 714 when provided by a reviewer. Such annotations may correspond conceptually to markers 610-616 as shown in FIG. 6, and timeline 714 may correspond conceptually to timeline 210 as shown in FIG. 6. For example, a first annotation 716 may include information that indicates the annotation is from a first reviewer 116, and includes the first reviewer's first comment at a first time value. A second annotation 718 may include information that indicates the annotation is from a second reviewer 118, and includes the second reviewer's first comment at a second time value. A third annotation 718 may include information that indicates the annotation is from the second reviewer 118, and includes the second reviewer's second comment at a third time value. A fourth annotation 720 may include information that indicates the annotation is from the first reviewer 116, and includes the first reviewer's second comment at a fourth time value. An Nth annotation 724 may include information that indicates that the annotation is from an Nth reviewer, and includes the Nth reviewer's Nth comment at an Nth time value. In one embodiment, such annotations 716-724 may comprise metadata tags correlated to the annotations provided by reviewers 116-120, and annotation map 700 may be utilized by content creation or editing program interface 200 in aggregating one or more comments from one or more reviewers 116-120, although the scope of the claimed subject matter is not limited in this respect.

Figure 8:
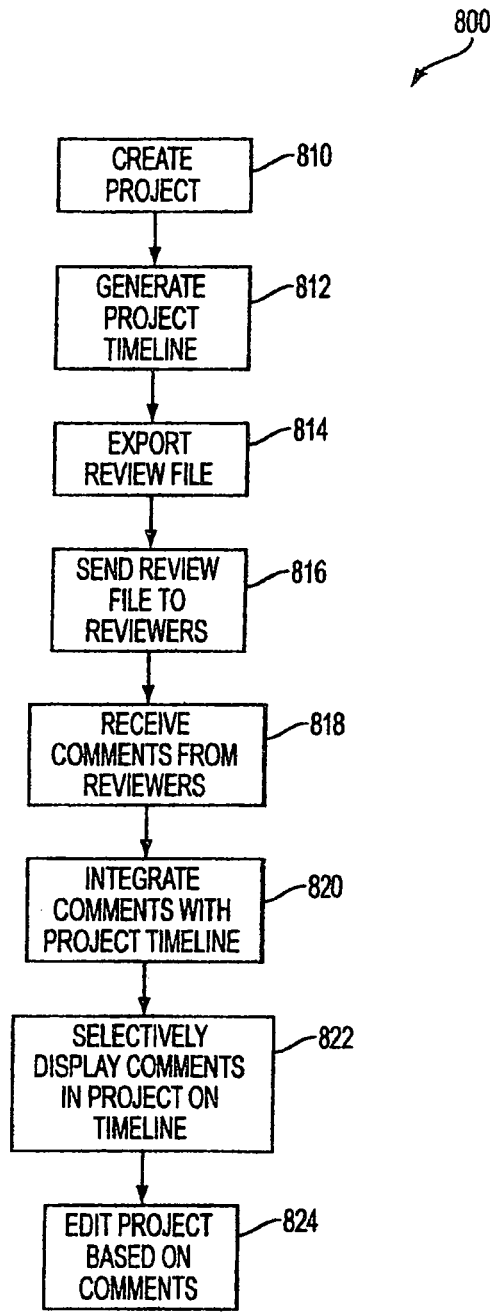
FIG. 8 is a flow diagram of a method for creating a timeline for signature based content and for exporting a review file for a reviewer of the content in accordance with one or more embodiments.

Referring now to FIG. 8, a flow diagram of a method for creating a signature for signature based media content and for exporting a review file for a reviewer of the content in accordance with one or more embodiments will be discussed. The method 800 may be implemented in general by content creator/editor 110 using content creation or editing program interface 200 as described herein, although the scope of the claimed subject matter is not limited in this respect. A project 220 having content 212 to be reviewed by one or more reviewers 116-120 may be generated at block 810, and a timeline 210 for project 220 may be generated at block 812. A review filed may then be exported at block 814 where the review file may include timeline 210, and the review file may be sent to one or more reviewers 116-120 at block 816. After reviewers 116-120 have reviewed content 212, with respect to timeline 210, generated annotations of content 212, and stored the annotations in an annotation file, the comments in the annotation file may be received from reviewers 116-120 at block 818, and the comments may be integrated with timeline 210 of project 220 at block 820. Content creator/editor 110 may selectively display one or more of comments or other annotations in project 220 on timeline 210 at block 822, and content creator/editor 110 may selectively edit project 214 and content 212 at block 824 based at least in part on one or more of the comments or annotations of content 212 provided by one or more of reviewers 116-120, although the scope of the claimed subject matter is not limited in this respect.

Figure 9:
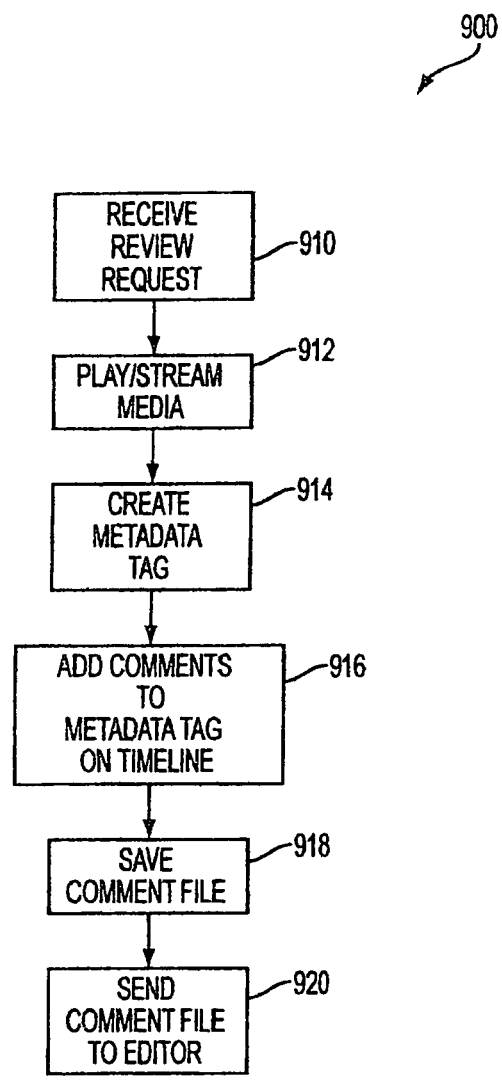
FIG. 9 is a flow diagram of a method for reviewing and annotating signature based content in accordance with one or more embodiments.

Referring now to FIG. 9, a flow diagram of a method for reviewing and annotating signature based content in accordance with one or more embodiments will be discussed. The method 900 may be implemented by one or more of reviewers 116-120 using review program 400 as shown in and described with respect to FIGS. 4 and 5, although the scope of the claimed subject matter is not limited in this respect. One or more reviewers 116-120 may receive a review request to review content 212 of a project 220 at block 910 from a content creator/editor 110. A reviewer may play a media file 214 containing content 212 at block 912, or alternatively may stream media file 214 containing content 212 at block 912 from a location or server at which media file 214 may be stored. Reviewers 116-120 may provide comments or other annotations on content 212, for example with respect to a signature of content 212 such as timeline 210, and then create one or more metadata tags 914 on such comments or annotations at block 914 that correlate with the signature of content 212 at which the comment or annotation is made, for example a time value in timeline 210. Comments and metadata tags may be added to timeline 210 at respective time values at block 916 and saved to a comment file at block 918. The comment file including the comments, annotations, or metadata tags may be saved independent of content 212 and sent back to content creator/editor 110 at block 920 so that content creator/editor 110 may view the comments, annotations, or metadata tags and selectively edit or change content based at least in part on the comments, annotations, or metadata tags, although the scope of the claimed subject matter is not limited in this respect.

Figure 10:
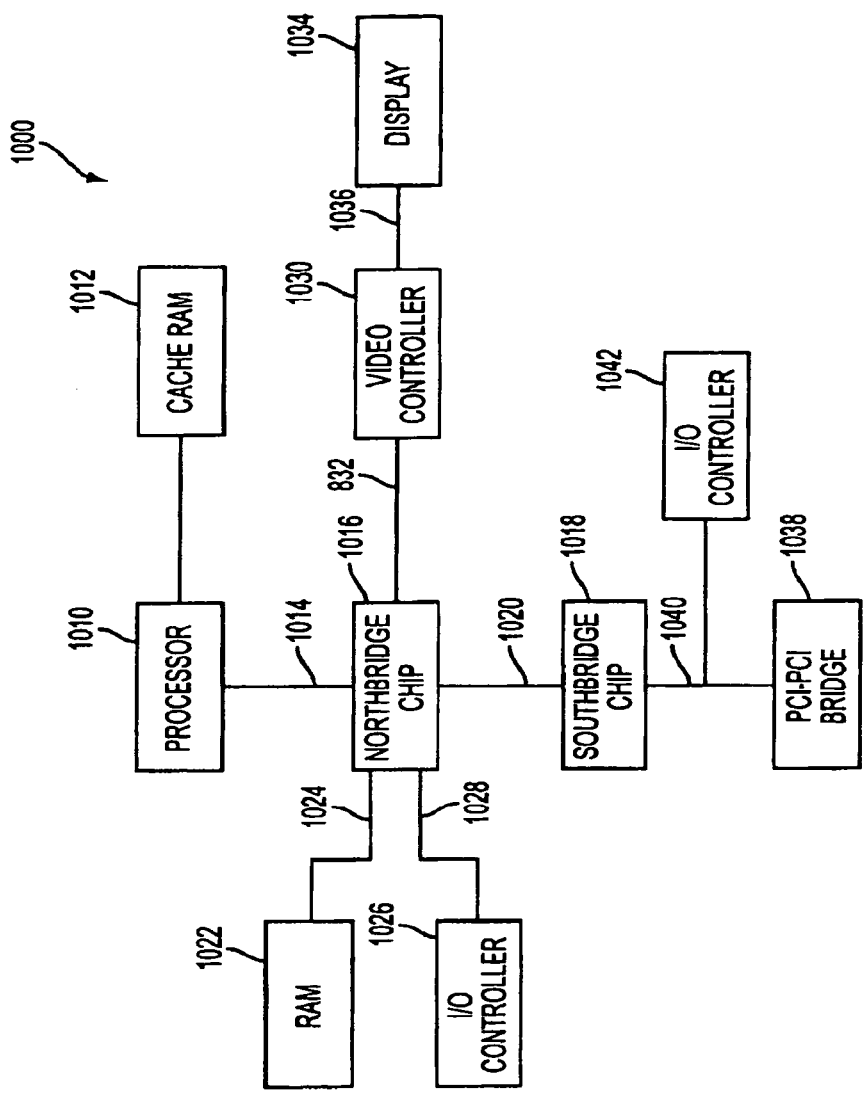
FIG. 10 is a block diagram of a computing platform suitable for running a program to create and edit signature based content and for reviewing timeline based content in accordance with one or more embodiments.

Referring now to FIG. 10, a block diagram of a computing platform suitable for running a program to create and edit timeline based media content and for reviewing timeline based media content in accordance with one or more embodiments will be discussed. The computing platform 1000 shown in FIG. 10 may comprise, for example, any one or more of content creator/editor 110, network 112, media server 114, or reviewer 1, reviewer 2, or reviewer N as shown in FIG. 1, although the scope of the claimed subject matter is not limited in this respect. Computing platform 1000 may include a processor 1010 coupled to a cache random access memory (RAM) 1012 via a back side bus 1011. Processor 1010 may also couple to a chipset that includes a Northbridge chip 1016 via a front side bus 1014, and also to a Southbridge chip 1018 via bus 1020. In one embodiment, the Northbridge chip 1016 in general may be utilized to connect a processor to memory, to an input/output bus, to a video bus, and to Level 2 cache, although the scope of the claimed subject matter is not limited in this respect. In one embodiment, the Southbridge chip 1018 may be utilized to control input/output functions, the basic input/out system (BIOS), an interrupt control functions of Integrated Drive Electronics (IDE) devices such as hard disks or compact disk-read only memory (CD-ROM) devices or the like, although the scope of the claimed subject matter is not limited in this respect. A random access memory (RAM) 1022 may couple to the Northbridge chip 1016 via a main memory bus 1024, and an input/output (I/O) controller 1026 may also couple to Northbridge chip 1016 via I/O bus 1028. In one embodiment, I/O controller 1026 and I/O bus 1028 may be in compliance with a Small Computer Systems Interface (SCSI) specification such as the American National Standards Institute (ANSI) X3.131-1994 SCSI-2 specification, although the scope of the claimed subject matter is not limited in this respect. In an alternative embodiment, I/O controller 1026 and I/O bus 1028 may be in compliance with a Peripheral Component Interconnect (PCI) bus, although the scope of the claimed subject matter is not limited in this respect.

A video controller 1030 may couple to the Northbridge chip 1016 via a video bus 1032 which in one embodiment may comprise an Accelerated Graphics Port (AGP) bus, although the scope of the claimed subject matter is not limited in this respect. Video controller 1030 may provide video signals to a display 1034 via a display interface 1036 which in one embodiment may comprise a Digital Visual Interface (DVI) in compliance with a standard promulgated by the Digital Display Working Group, although the scope of the claimed subject matter is not limited in this respect. The Southbridge chip 1018 may couple to a peripheral component interconnect to peripheral component interconnect (PCI-PCI) bridge via input/output bus 1040, which may in turn couple to an I/O controller 1042 to control various peripheral devices such as Universal Serial Bus (USB) devices, or devices compatible with a Institute of Electrical and Electronics Engineers (IEEE) 1394 specification, although the scope of the claimed subject matter is not limited in this respect.

Although the claimed subject matter has been described with a certain degree of particularity, it should be recognized that elements thereof may be altered by persons skilled in the art without departing from the spirit and scope of the claimed subject matter. It is believed that the review of signature based content and many of its attendant advantages will be understood by the forgoing description, and it will be apparent that various changes may be made in the form, construction and arrangement of the components thereof without departing from the scope and spirit of the claimed subject matter or without sacrificing all of its material advantages, the form herein before described being merely an explanatory embodiment thereof, and further without providing substantial change thereto. It is the intention of the claims to encompass and include such changes.

What is claimed is:

1. A method for having content reviewed, comprising:
using a processor to generate a signature comprising a set of signature values for content to be reviewed, wherein each of the set of signature values is related to a time based flow of the content and each signature value comprises a time value based on a timeline;
exporting the content to a review file;
sending the review file to one or more reviewers without requiring a server to manage the reviewing of the content; and
receiving an annotation file from at least one of the one or more reviewers, wherein:
the content is annotated with an annotation;
the annotation is associated with a corresponding signature value, wherein the corresponding signature value is one of the set of signature values that corresponds to the occurrence of the annotation with respect to the time based flow of the content; and
the annotation is stored in the annotation file along with the corresponding signature value.

2. A method as claimed in claim 1, wherein said exporting includes adding the content to the review file wherein the one or more reviewers may review the content from the review file with respect to the set of signatures.

3. A method as claimed in claim 1, wherein said exporting includes adding a link to the location of the review file wherein the one or more reviewers may review the content with respect to the timeline by streaming the content via the link, wherein the streaming is managed by a client software program operated by the one or more reviewers.

4. A method as claimed in claim 1, wherein the annotation file includes annotations of the content stored as metadata tags at time locations of the content.

5. A method as claimed in claim 1, wherein the annotation file does not include the content.

6. A method as claimed in claim 1, further comprising selectively displaying the annotations from at least one of the one or more reviewers if playing the content without displaying annotations from a non-selected reviewer.

7. A method as claimed in claim 1, wherein the annotations include at least one of text information, graphical information, audio information, and/or video information.

8. A method for reviewing content, comprising:
receiving a review file for content to be reviewed;
playing the content with respect to a signature comprising a set of signature values of the content, wherein each of the set of signature values is related to a time based flow of the content stored in the review file and each signature value comprises a time value based on a timeline;
annotating the content with an annotation;
using a processor to associate the annotation with respect to a corresponding signature value, wherein the corresponding signature value is one of the set of signature values that corresponds to the occurrence of the annotation with respect to the time based flow of the content;
storing the annotation in an annotation file along with the corresponding signature value; and
sending the annotation file to a user without requiring a server to manage the reviewing of the content.

9. A method as claimed in claim 8, wherein the annotation is stored as a metadata tag at a time location in a timeline that corresponds to the time of the annotation with respect to the content.

10. A method as claimed in claim 8, wherein said playing includes playing the content stored in the review file.

11. A method as claimed in claim 8, wherein said playing includes streaming the content from a location where the content is stored from a link to the content in the review file, wherein the streaming is managed by a client software program on a local machine of a reviewer of the content.

12. A method as claimed in claim 8, further comprising compressing the annotation file prior to said sending.

13. A method as claimed in claim 8, further comprising encrypting the annotation file prior to said sending.

14. A method as claimed in claim 8, wherein sending the annotation file to a user to manage the reviewing of the content comprises the user integrating the annotation file with a time based flow of the content.

15. A method as claimed in claim 8, wherein sending the annotation file to a user to manage the reviewing of the content comprises the user observing the annotation if the matching signature occurs during playback of the content.

16. A method as claimed in claim 8, wherein said storing includes storing the annotations independent of the content.

17. A method as claimed in claim 8, wherein the signature includes least one of a time value, a time offset value, audio level, color value, brightness value, opacity value, intensity value, saturation value, a coordinate value, an object in media, and/or a metadata value, wherein the signature correlates an annotation of the content with a location in the content with respect to the time based flow of the content.

18. A method as claimed in claim 8, wherein the signature includes at least a pair of a time value, a time offset value, audio level, color value, brightness value, opacity value, intensity value, saturation value, a coordinate value, an object in media, and/or a metadata value, wherein the pair correlates an annotation of the content with a location in the content with respect to the time based flow of the content.

19. An article comprising a storage medium having stored thereon instructions that, when executed by a computing platform, result in having content reviewed by:
generating a signature comprising a set of signature values for content to be reviewed, wherein each of the set of signature values is related to a time based flow of the content and each signature value comprises a time value based on a timeline;
exporting the content to a review file;
sending the review file to one or more reviewers without requiring a server to manage the reviewing of the content; and
receiving the annotation file from at least one of the one or more reviewers, wherein:
the content is annotated with an annotation;
the annotation is associated with a corresponding signature value, wherein the corresponding signature value is one of the set of signature values that corresponds to the occurrence of the annotation with respect to the time based flow of the content; and
the annotation is stored in an annotation file along with the corresponding signature value.

20. An article as claimed in claim 19, wherein said exporting includes adding the content to the review file wherein the one or more reviewers may review the content from the review file with respect to the set of signatures.

21. An article as claimed in claim 19, wherein said exporting includes adding a link to the location of the review file wherein the one or more reviewers may review the content with respect to the timeline by streaming the content via the link, wherein the streaming is managed by a client software program operated by the one or more reviewers.

22. An article as claimed in claim 19, wherein the annotation file includes annotations of the content stored as metadata tags at time locations of the content.

23. An article as claimed in claim 19, wherein the annotation file does not include the content.

24. An article as claimed in claim 19, wherein the instructions, when executed, further result in having content reviewed by selectively displaying the annotations from at least one of the one or more reviewers if playing the content without displaying annotations from a non-selected reviewer.

25. An article as claimed in claim 19, wherein the annotations include at least one of text information, graphical information, audio information, and/or video information.

26. An article comprising a storage medium having stored thereon instructions that, when executed by a computing platform, result the reviewing of content by:
receiving a review file for content to be reviewed;
playing the content with respect to a signature comprising a set of signature values of the content, wherein each of the set of signature values is related to a time based flow of the content stored in the review file and each signature value comprises a time value based on a timeline;
annotating the content with an annotation;

associating the annotation with respect to a corresponding signature value, wherein the corresponding signature value is one of the set of signature values that corresponds to the occurrence of the annotation with respect to the time based flow of the content;

storing the annotation in an annotation file along with the corresponding signature value; and sending the annotation file to a user without requiring a server to manage the reviewing of the content.

27. An article as claimed in claim 26, wherein the annotation is stored as a metadata tag at a time location in a timeline that corresponds to the time of the annotation with respect to the content.

28. An article as claimed in claim 26, wherein said playing includes playing the content stored in the review file.

29. An article as claimed in claim 26, wherein said playing includes streaming the content from a location where the content is stored from a link to the content in the review file, wherein the streaming is managed by a client software program on a local machine of a reviewer of the content.

30. An article as claimed in claim 26, wherein the instructions, when executed, further result in the reviewing of content by compressing the annotation file prior to said sending.

31. An article as claimed in claim 26, wherein the instructions, when executed, further result in the reviewing of content by encrypting the annotation file prior to said sending.

32. An article as claimed in claim 26, wherein sending the annotation file to a user to manage the reviewing of the content comprises the user integrating the annotation file with a time based flow of the content.

33. A method as claimed in claim 26, wherein sending the annotation file to a user to manage the reviewing of the content comprises the user observing the annotation if the matching signature occurs during playback of the content.

34. A method as claimed in claim 26, wherein said storing includes storing the annotations independent of the content.

35. A method as claimed in claim 26, wherein the signature includes at least one of a time value, a time offset value, audio level, color value, brightness value, opacity value, intensity value, saturation value, a coordinate value, an object in media, and/or a metadata value, wherein the signature correlates an annotation of the content with a location in the content with respect to the time based flow of the content.

36. A method as claimed in claim 26, wherein the signature includes at least a pair of a time value, a time offset value, audio level, color value, brightness value, opacity value, intensity value, saturation value, a coordinate value, an object in media, and/or a metadata value, wherein the pair correlates an annotation of the content with a location in the content with respect to the time based flow of the content.

37. An apparatus, comprising:
a processor; and
a memory to couple to said processor, said processor to execute a program stored in said memory to result in having content reviewed by:
generating a signature comprising a set of signature values for content to be reviewed, wherein each of the set of signature values is related to a time based flow of the content and each signature value comprises a time value based on a timeline;
exporting the content to a review file;
sending the review file to one or more reviewers without requiring a server to manage the reviewing of the content; and
receiving the annotation file from at least one of the one or more reviewers, wherein:
the content is annotated with an annotation;
the annotation is associated with a corresponding signature value, wherein the corresponding signature value is one of the set of signature values that corresponds to the occurrence of the annotation with respect to the time based flow of the content; and
the annotation is stored in an annotation file along with the corresponding signature value.

38. An apparatus as claimed in claim 37, wherein said exporting includes adding the content to the review file wherein the one or more reviewers may review the content from the review file with respect to the set of signatures.

39. An apparatus as claimed in claim 37, wherein said exporting includes adding a link to the location of the review file wherein the one or more reviewers may review the content with respect to the timeline by streaming the content via the link, wherein the streaming is managed by a client software program operated by the one or more reviewers.

40. An apparatus as claimed in claim 37, wherein the annotation file includes annotations of the content stored as metadata tags at time locations the content.

41. An apparatus as claimed in claim 37, wherein the annotation file does not include the content.

42. An apparatus as claimed in claim 37, the program executed by the processor to further result in having content reviewed by selectively displaying the annotations from at least one of the one or more reviewers when playing the content without displaying annotations from a non-selected reviewer.

43. An apparatus as claimed in claim 37, wherein the annotations include at least one of text information, graphical information, audio information, and/or video information.

* * * * *